US006585072B2

(12) United States Patent
Scherbarth

(10) Patent No.: US 6,585,072 B2
(45) Date of Patent: *Jul. 1, 2003

(54) MOTORCYCLE FENDER MOUNTING SYSTEM

(75) Inventor: Brian M. Scherbarth, Menomonee Falls, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/842,221

(22) Filed: Apr. 25, 2001

(65) Prior Publication Data

US 2001/0027888 A1 Oct. 11, 2001

Related U.S. Application Data

(63) Continuation of application No. 09/362,202, filed on Jul. 28, 1999.

(51) Int. Cl.$^7$ .............................................. B62D 61/02
(52) U.S. Cl. .................................... 180/219; 280/152.1
(58) Field of Search ....................... 180/219; 280/152.1, 280/152.2, 152.3, 288.4, 852, 854

(56) References Cited

U.S. PATENT DOCUMENTS

| | | | | |
|---|---|---|---|---|
| 4,958,451 A | * | 9/1990 | Iwakura et al. | ............... 40/204 |
| 5,299,832 A | | 4/1994 | Price, Sr. | |
| 5,791,760 A | * | 8/1998 | Scherbarth et al. | ............ 362/72 |
| 6,053,626 A | | 4/2000 | Zagrodnik et al. | |
| 6,073,948 A | | 6/2000 | Motojima et al. | |
| 6,257,362 B1 | * | 7/2001 | Scherbarth | ................. 180/219 |
| 6,318,743 B1 | * | 11/2001 | Nakashima et al. | ..... 280/152.1 |

FOREIGN PATENT DOCUMENTS

IT              456784           4/1950

OTHER PUBLICATIONS

1987–1989 1340 Parts Catalog, pp. 178–179.
1997 Harley Davidson Motorcycles 1 page (not numbered).
1998 Star Yamaha 2 facing pages (not numbered).
"1985 to 1990 FX/Softail Models Service Manual", 1989, Harley–Davidson Motor Company, p. 2–105.
Palmer, Bruce, "How to Restore Your Harley–Davidson", 1994, Motorbooks International Publishers & Wholesalers, p. 77.
Cook, Marc, "Accessories for Harley–Davidson Motorcycles", 1998, David Bull Publishing, pp. 24, 120, 148.

* cited by examiner

Primary Examiner—Lesley D. Morris
Assistant Examiner—L. Lum
(74) Attorney, Agent, or Firm—Michael Best & Friedrich LLP

(57) ABSTRACT

A motorcycle comprising a frame having left and right tail supports extending rearward, front and rear wheels coupled to the frame, and a rear fender positioned over the rear wheel and between the tail supports. The rear fender includes left and right flanges positioned adjacent inner surfaces of the left and right tail supports, respectively. In order to provide additional support to the fender, the motorcycle can further include an inner support coupled to an inner surface of the fender. Preferably, the inner support and the fender define a wire path in which wires from a taillight can be routed, thereby protecting the wires. The wire path can be continued by another wire path defined between the fender and a rear housing that has an overlapping portion coupled to the fender.

13 Claims, 8 Drawing Sheets

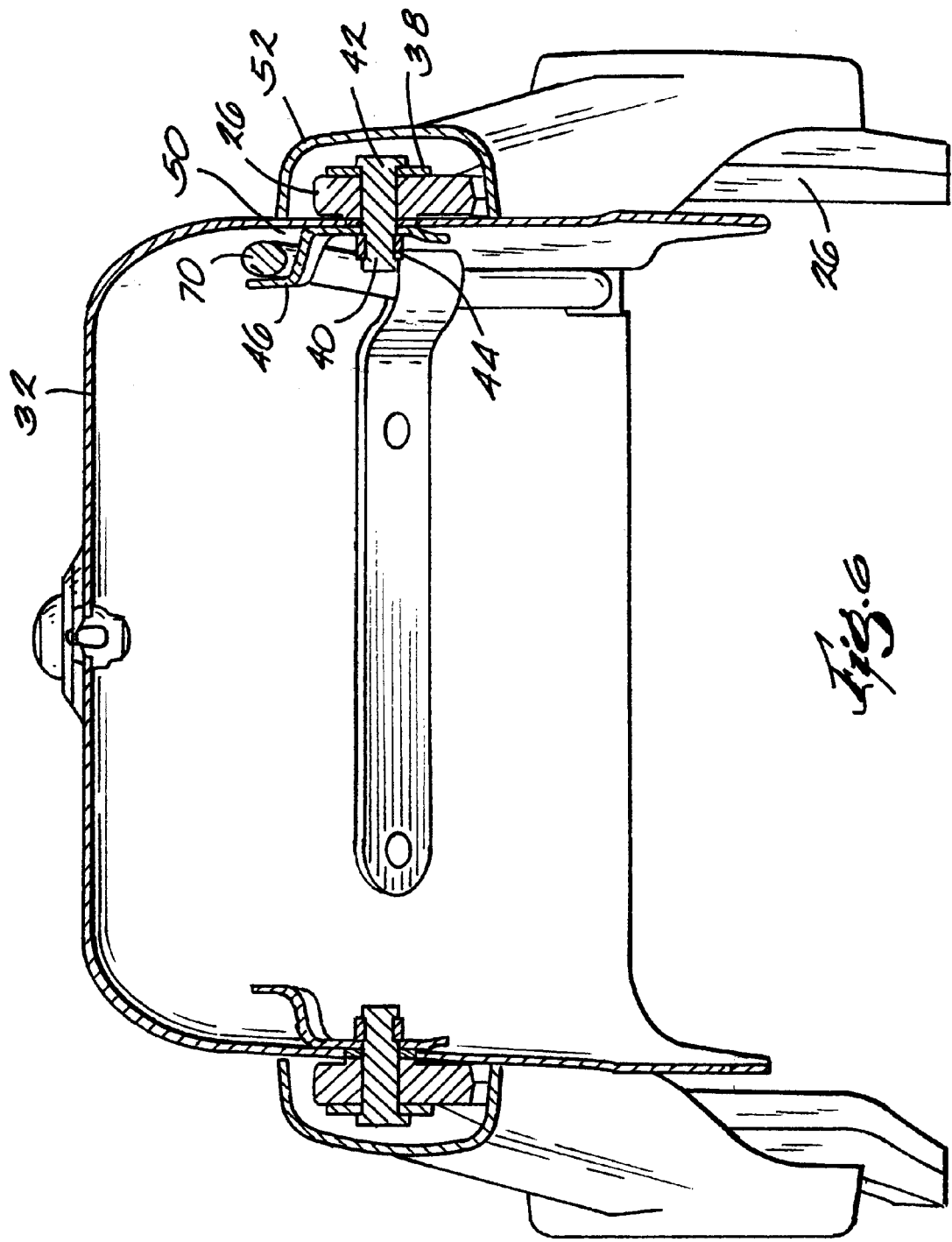

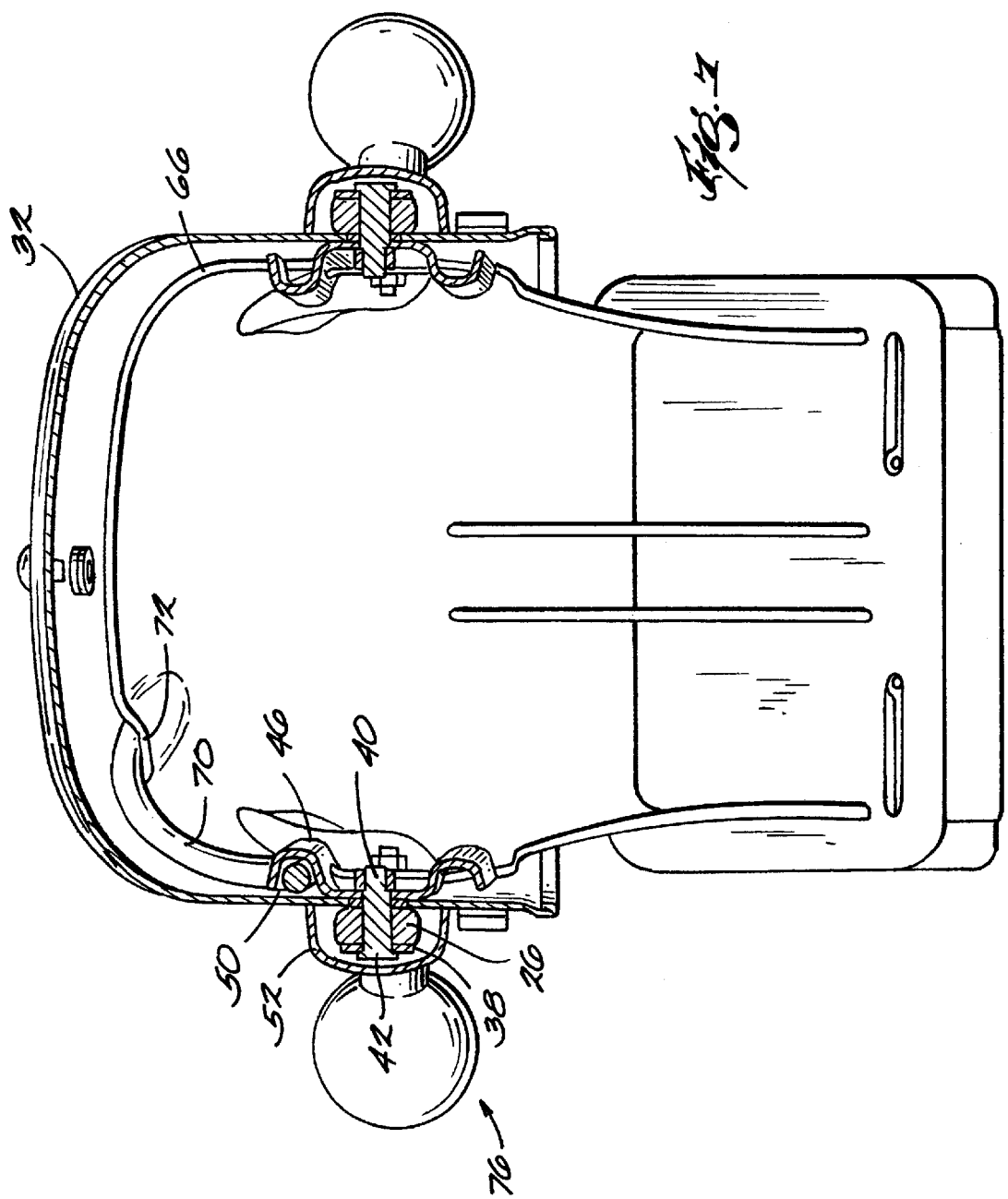

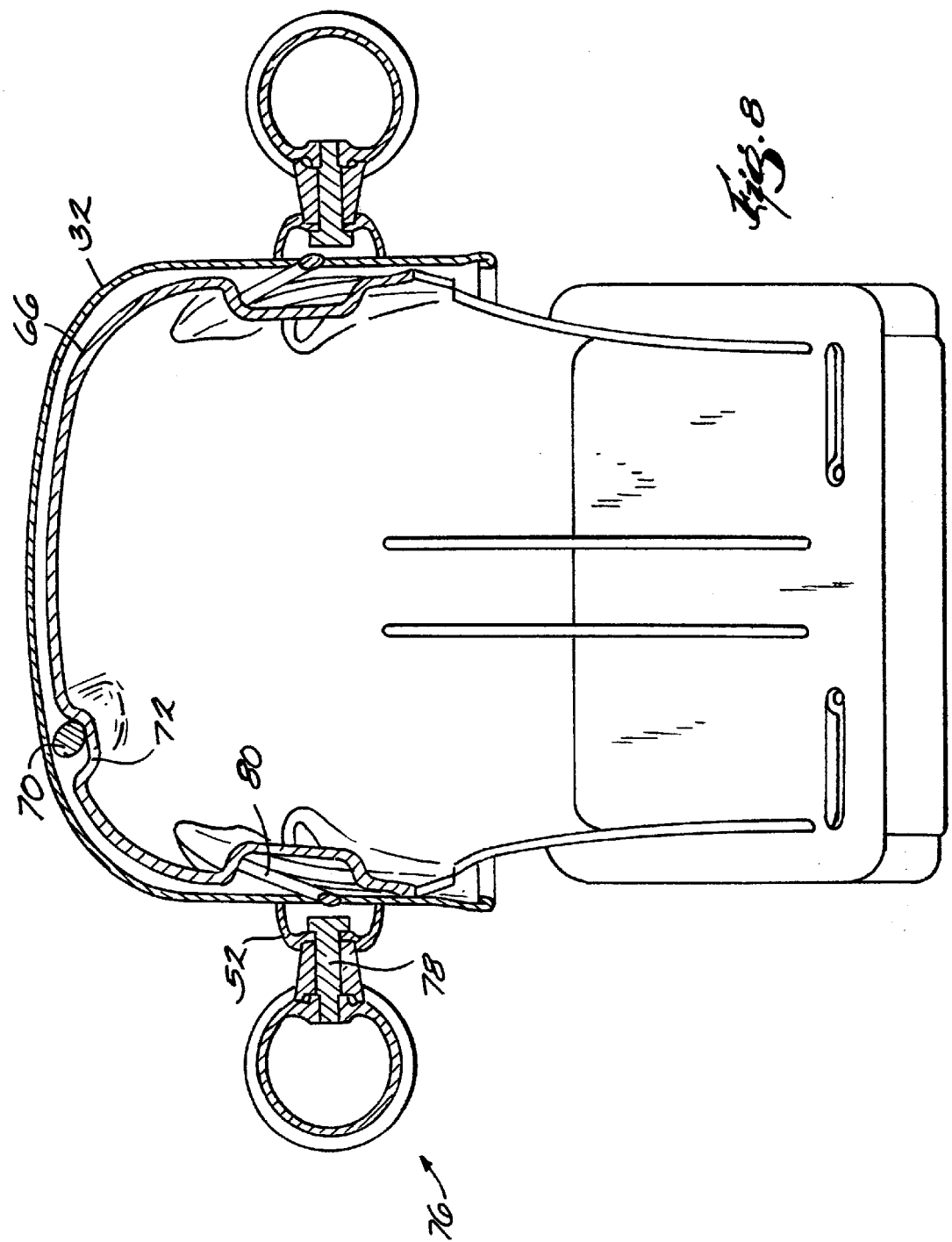

MOTORCYCLE FENDER MOUNTING SYSTEM

This is a continuation of application Ser. No. 09/362,202 filed Jul. 28, 1999, the entire contents of which are herein incorporated by reference.

FIELD OF THE INVENTION

The present invention relates generally to the field of motorcycles and, more specifically, to the field of fender mounting systems.

BACKGROUND OF THE INVENTION

Motorcycles typically include fenders positioned over the wheels to prevent debris (e.g., dirt, water, etc.) from being thrown into the air as the motorcycle travels over a surface. For example, front and rear fenders can be positioned around the front and rear wheels, respectively.

The front fender can be coupled to the front fork of the motorcycle so that the front fender turns with the fork and wheel. The front fender can be secured to the fork so that the front fender either moves upward when the front wheel encounters a bump or, alternatively, stays stationary relative to the upward moving wheel.

The rear fender can be coupled to the tail section of the frame in a position over the rear wheel. This is commonly done in such a way that the rear fender does not move with the rear wheel when the rear wheel encounters a bump. In this design, the rear fender is typically bolted to the tail section of the motorcycle using bolts that pass through the tail section and through the rear fender.

Rear fenders are also commonly used to support a taillight assembly, which can include a brake light and/or directional lights. These lights are provided with power from a main control box, which is typically located in front of the rear fender, via a taillight wire harness. This harness can be routed around the underside of the rear fender using wiring clips to hold the harness in place.

SUMMARY OF THE INVENTION

The above-described design provides an adequate means for attaching the rear fender to the motorcycle and for routing taillight wiring. However, it can be understood that the above-described bolts will be visible, which can detract from the overall aesthetic quality of the motorcycle. In addition, routing the wires along the underside of the rear fender can result in dirty wires, which can be difficult to clean.

The present invention provides an improved fender mounting system, which also includes an improved taillight wire routing system. In one aspect, the invention is embodied in a motorcycle comprising a frame having left and right tail supports extending rearward, a front wheel coupled to a front section of the frame, a rear wheel coupled to a rear section of the frame, and a rear fender positioned over the rear wheel and between the tail supports. The rear fender includes left and right flanges positioned adjacent inner surfaces of the left and right tail supports, respectively. A fender mounting assembly interconnects the rear fender to the tail supports. The assembly includes a left fastener positioned through the left tail support and through the left flange, and a right fastener positioned through the right tail support and through the right flange. Each fastener includes a low profile head adjacent the outer surface of the corresponding tail support.

In one embodiment, each fastener includes a stud plate and a threaded stud secured to the stud plate. For example, each stud plate could support two threaded studs that are each positioned through the corresponding tail support and fender to thereby prevent rotation of the fasteners.

In order to improve the cosmetics of the design, the motorcycle can further include a cover positioned over each of the tail supports and covering each of the fasteners. Each cover preferably is coupled to the frame by one or more front fasteners. In addition, inner fasteners can be inserted through the fender and tail support and secured to an inner surface of the cover to thereby sandwich the tail support between the fender and the cover. The inner fasteners are not visible from the exterior of the motorcycle, which enhances the overall aesthetics of the motorcycle.

In order to provide additional support to the fender, the motorcycle can further include an inner support coupled to an inner surface of the fender. Preferably, the inner support and the fender define a wire path in which taillight wires can be routed, thereby protecting the wires. The wire path can be continued by another wire path defined between the fender and a taillight support that has an overlapping portion coupled to the fender.

The invention is also embodied in a method of mounting a rear fender to a motorcycle having two tail supports spaced from each other. The method comprises the steps of positioning the fender between the tail supports, inserting a fastener through each tail support and through the fender, and positioning a cover over each tail support to cover the fasteners. Preferably, the step of positioning the cover includes inserting inner fasteners through the fender, through the tail support, and into the cover. In addition, to add further support to the fender, the method can include the step of coupling an inner support to an inner surface of the fender. If desired, the method can further include the step of positioning wires between the inner support and the fender to thereby provide a protected wire path for the taillight wires.

BRIEF DESCRIPTION OF THE DRAWINGS

FIG. 6 is a section is a section view taken along line 6—6 in FIG. 3.

FIG. 7 is a section view taken along line 7—7 in FIG. 3.

FIG. 8 is a section view taken along line 8—8 in FIG. 3.

DETAILED DESCRIPTION

Figure 1:
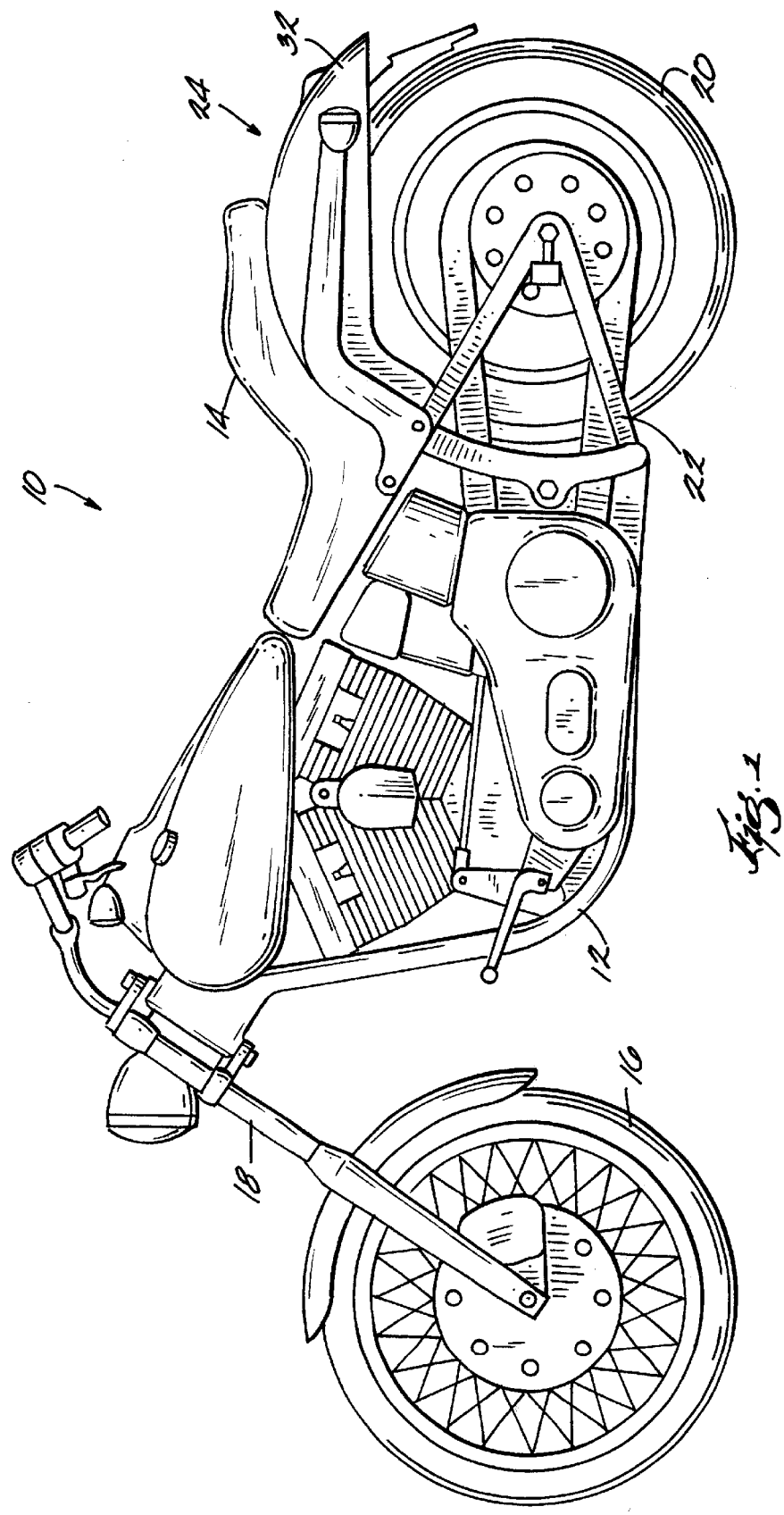
FIG. 1 is a side view of a motorcycle having a tail section embodying the present invention.

The motorcycle 10 illustrated in FIG. 1 includes a frame 12, a seat 14 coupled to the frame 12, a front wheel 16 coupled to the frame by a front fork 18, and a rear wheel 20 coupled to the frame by a swing arm assembly 22. A tail section 24 forms the rear portion of the motorcycle 10 underneath the seat 14 and above the rear wheel 20.

Figure 2:
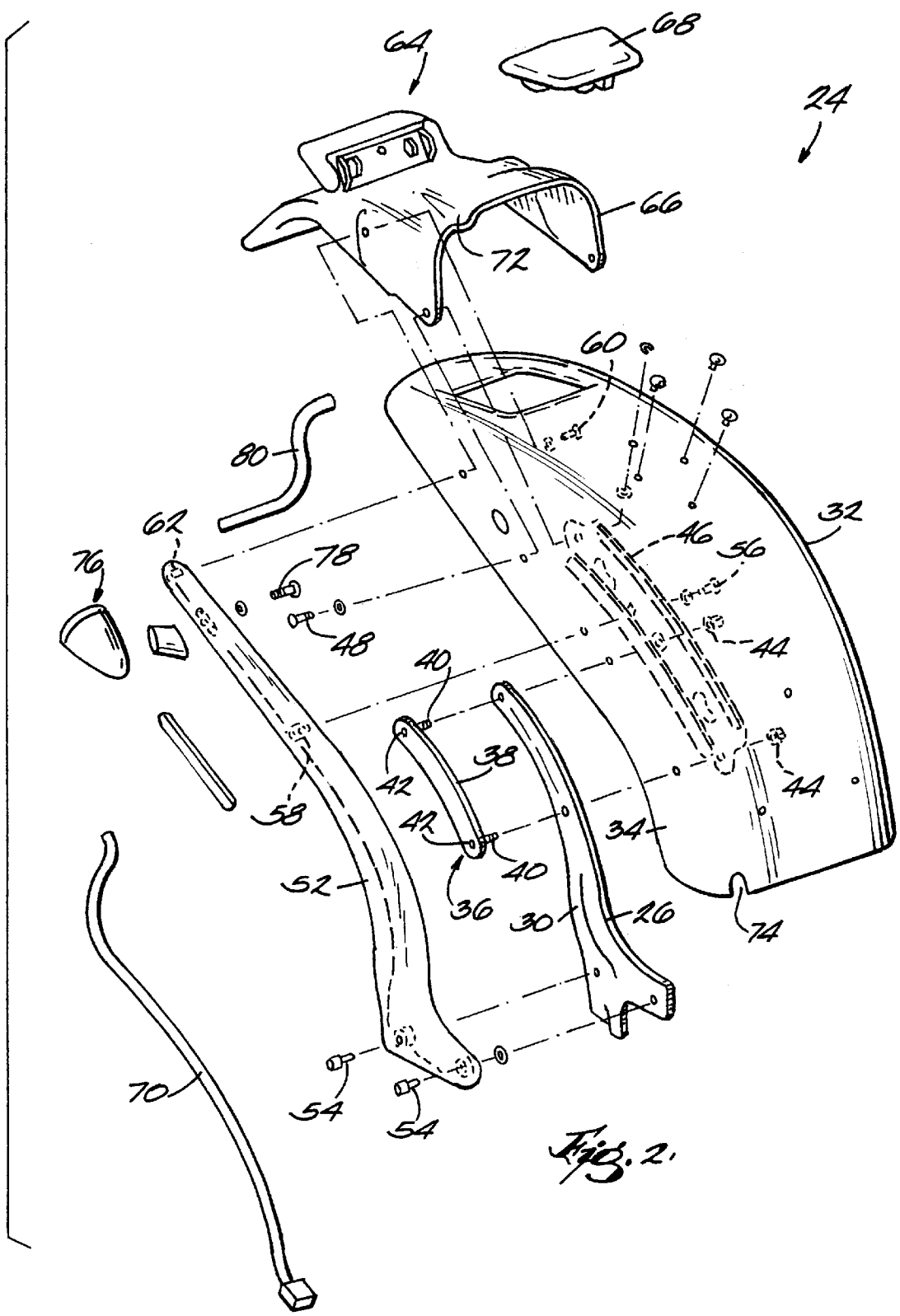
FIG. 2 is an exploded perspective view of the tail section illustrated in FIG. 1.
Figure 3:
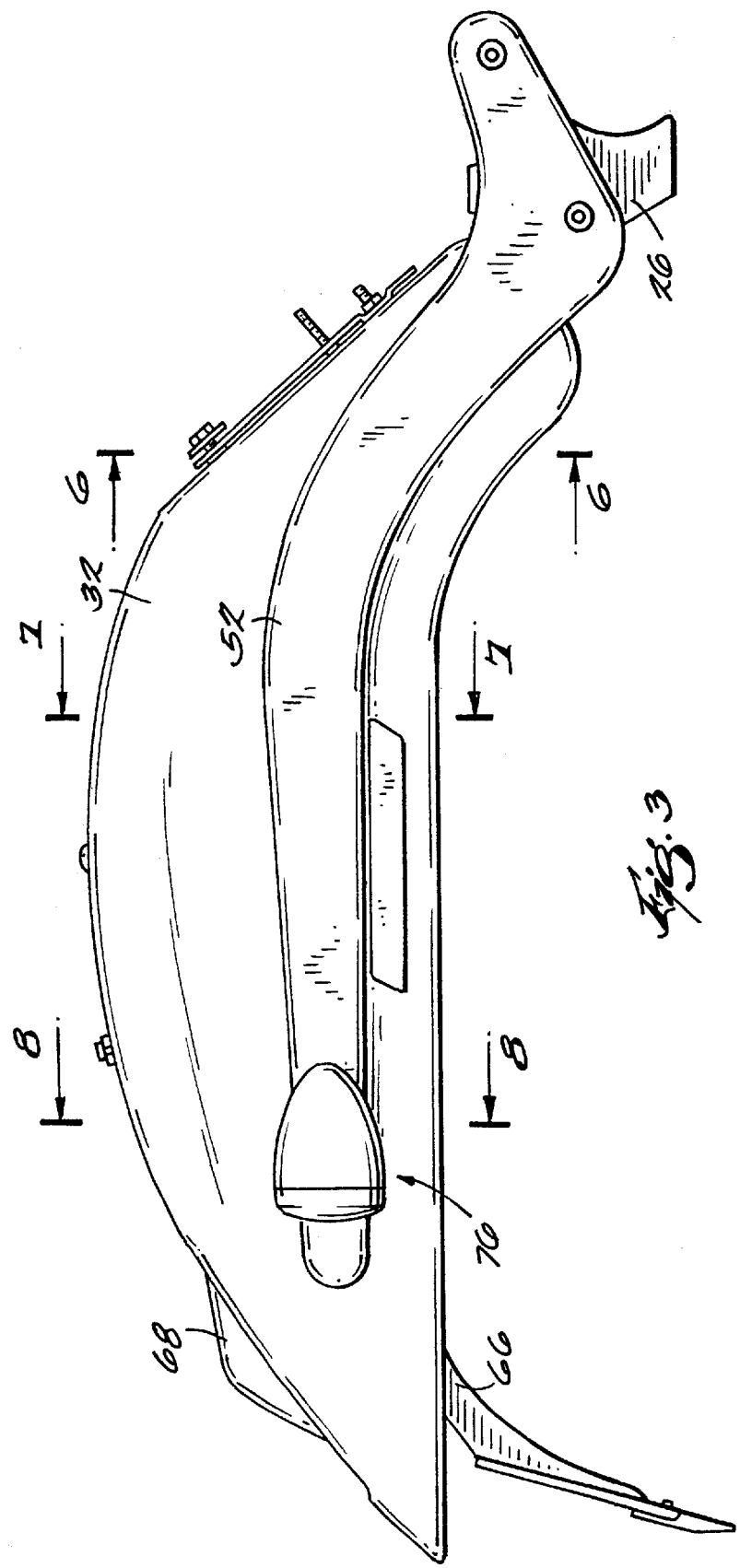
FIG. 3 is an enlarged side view of the tail section of FIG. 1.
Figure 4:
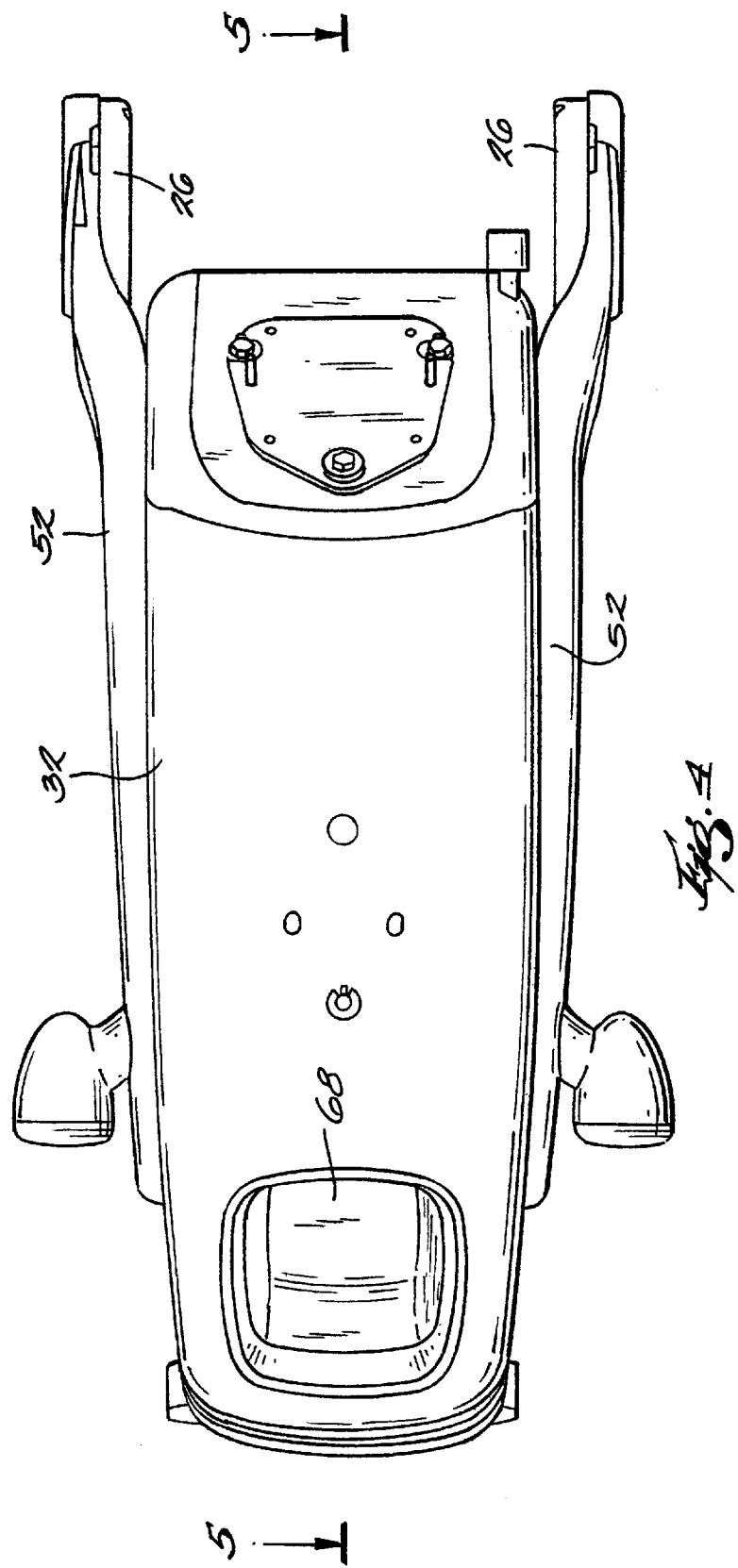
FIG. 4 is a top view of the tail section illustrated in FIG. 1.
Figure 5:
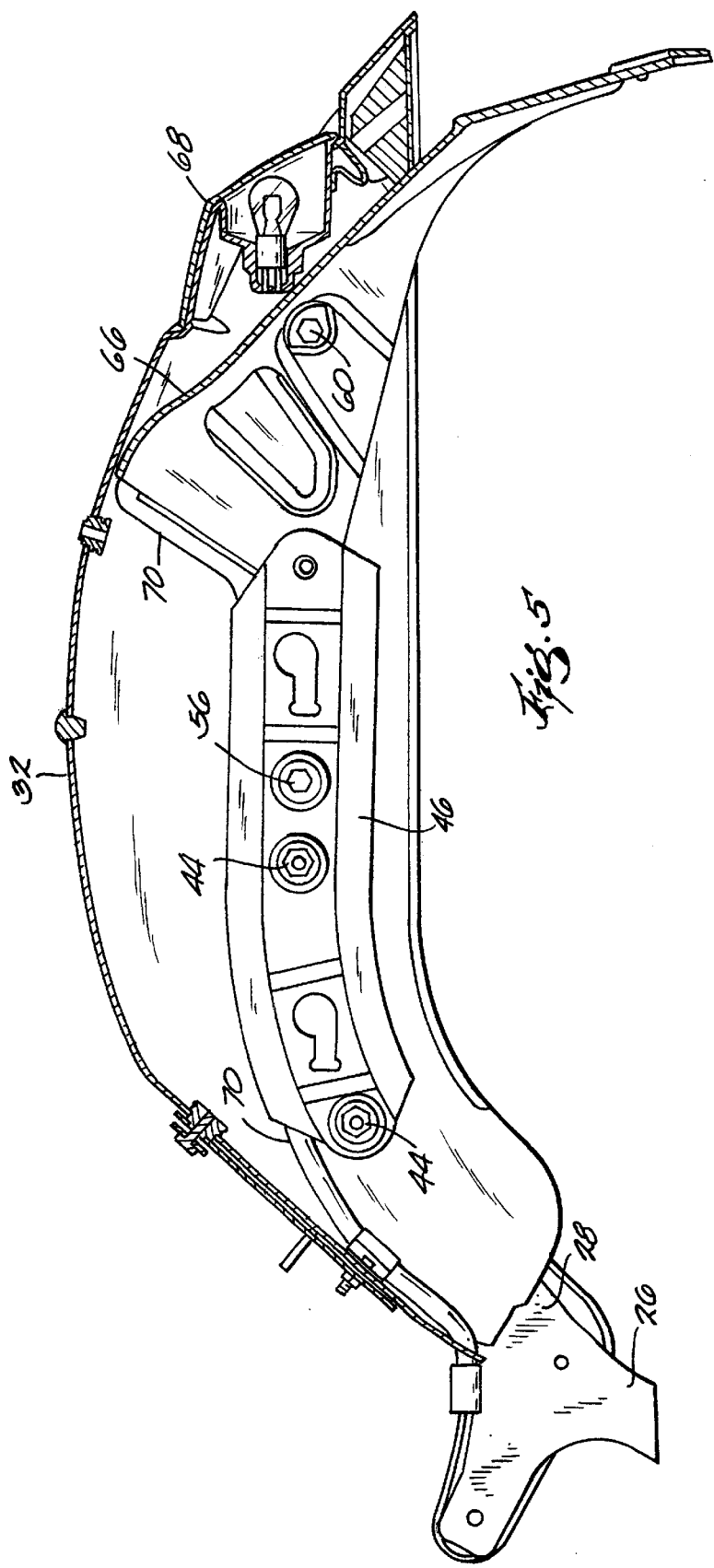
FIG. 5 is a section view taken along line 5—5 in FIG. 4.

Referring to FIGS. 2–8, the tail section 24 includes tail supports 26 coupled to the frame 12. In the illustrated embodiment, the tail supports 26 are bolted to the frame 12 in a conventional manner, but could also be formed integrally with the frame 12. The tail supports 26 include inner surfaces 28 (FIG. 5) facing toward the centerline of the motorcycle 10, and outer surfaces 30 facing away from the centerline of the motorcycle 10. For ease of illustration, only one side of the tail section 24 is illustrated in FIG. 2. In this regard, only one side of the tail section 24 will be described below, unless otherwise noted.

A rear fender 32 is positioned between the tail supports 26, and includes flanges 34 extending downwardly adjacent the inner surfaces 28 of the corresponding tail supports 26. The rear fender 32 is coupled to the tail supports 26 by a fender mounting assembly including a low profile fastener 36 extending through the tail support 26 and through the corresponding flange 34 in the rear fender 32. The illustrated fastener 36 includes a stud plate 38 and two threaded studs 40 secured to the stud plate 38. Preferably, the threaded studs 40 include a low profile head 42. Threaded nuts 44 are threaded onto the threaded studs 40 to hold the assembly together.

In order to provide rigidity to the rear fender 32, the fender mounting assembly includes inner supports 46 mounted along the inner surface of each flange 34. The inner supports 46 are secured to the tail supports 26 by the low profile fasteners 36 and corresponding nuts 44. The inner supports 46 extend rearward further than the tail supports 26 to provide rigidity to the rear portion of the rear fender 32. A support fastener 48 secures the end of the inner support 46 to the rear fender 32. Each inner support 46 includes a groove 50 (FIGS. 6 and 7) that defines a wire path, the importance of which is described below in more detail.

The motorcycle 10 further includes tail covers 52 positioned over the tail supports 26 and a portion of the rear fender 32. Each tail cover 52 is secured to the tail support 26 by fasteners 54, and is designed to cover the low profile fastener 36 to thereby improve the aesthetics of the motorcycle 10. The tail cover 52 is also secured using an inner fastener 56 that extends through the inner support 46 and rear fender 32, and threads into a threaded opening 58 in the tail cover 52. Another inner fastener 60 extends through the rear fender 32, and into another threaded opening 62 in the rear end of the tail cover 52.

A rear lighting assembly 64 is mounted to the rear end of the rear fender 32. The rear lighting assembly 64 includes a rear housing 66, a tail light 68 mounted to the rear fender 32, and a rear lighting harness 70 extending from the tail light 68 toward the front of the motorcycle 10. The rear housing 66 provides extra stiffness to the rear section of the rear fender 32, provides a location 71 for mounting a license plate, and provides protection to the rear lighting harness 70. The rear housing 66 is secured to the rear fender 32 by the support fastener 48 that extends through the rear fender 32, through the rear housing 66, and into the inner support. The rear housing 66 is also secured by the inner fastener 60 that extends from the inside, through the rear housing 66 and rear fender 32, and into the threaded opening 62 in the tail cover 52.

The rear housing 66 includes a recessed portion 72 that facilitates routing the rear lighting harness 70 from the tail light 68 to the groove 50 in the inner support 46. The rear lighting harness 70 travels along the groove 50 and passes through an opening 74 in the front of the rear fender 32 where it can be routed to a main terminal (not shown).

A directional light assembly 76 is mounted to the tail cover 52 by a fastener 78 extending from the inside of the tail cover 52. In this manner, the fastener 78 will be completely hidden from view in the final assembled product. Wires 80 from the directional lights extend through the tail cover 52 and through a fender opening to be routed to a cavity defined between the rear housing 66 and the tail light 68. At this location, the wires 80 are coupled to the rear lighting harness 70.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle comprising:
    a frame including a tail support extending rearward, said tail support having an inner surface and an outer surface;
    a front wheel coupled to said frame;
    a rear wheel coupled to said frame;
    a rear fender positioned over said rear wheel, said rear fender including a flange positioned adjacent said inner surface of said tail support; and
    an inner support coupled to an inner surface of said fender, wherein said inner support and said fender define a wire path, and wherein said motorcycle further includes wires positioned in said wire path, and wherein said inner support includes a groove that at least partially defines said wire path.

2. A motorcycle as claimed in claim 1, wherein said groove is substantially as long as the inner support.

3. A motorcycle as claimed in claim 2, wherein said groove is substantially linear.

4. A motorcycle comprising:
    a frame including a tail support extending rearward, said tail support having an inner surface and an outer surface;
    a front wheel coupled to said frame;
    a rear wheel coupled to said frame;
    a rear fender positioned over said rear wheel, said rear fender including a flange positioned adjacent said inner surface of said tail support; and
    an inner support coupled to an inner surface of said fender, wherein said inner support and said fender define a wire path, and wherein said motorcycle further includes wires positioned in said wire path, and wherein said inner support is coupled to said tail support.

5. A motorcycle as claimed in claim 4, further comprising a rear housing including an underlying portion coupled to said fender, said underlying portion and said fender defining a rear wire path, wherein said wires are positioned in said rear wire path.

6. A motorcycle as claimed in claim 5, further comprising a taillight mounted to said underlying portion, wherein at least one of said wires is operably connected to said taillight and at least partially positioned between said underlying portion and said fender.

7. A motorcycle as claimed in claim 4, wherein said rear fender includes a forward end defining an opening, wherein said wires extend through said opening.

8. A motorcycle as claimed in claim 4, wherein said inner support extends rearward of and generally parallel to said tail support.

9. A motorcycle comprising:
- a frame including a tail support extending rearward, said tail support having an inner surface and an outer surface;
- a front wheel coupled to said frame;
- a rear wheel coupled to said frame;
- a rear fender positioned over said rear wheel, said rear fender including a flange positioned adjacent said inner surface of said tail support; and
- an inner support coupled to an inner surface of said fender, wherein said inner support and said fender define a wire path, and wherein said motorcycle further includes wires positioned in said wire path, and wherein said flange of said fender is sandwiched between said inner support and said tail support.

10. A motorcycle as claimed in claim 9, further comprising a rear housing including an underlying portion coupled to said fender, said underlying portion and said fender defining a rear wire path, wherein said wires are positioned in said rear wire path.

11. A motorcycle as claimed in claim 10, further comprising a taillight mounted to said underlying portion, wherein at least one of said wires is operably connected to said taillight and at least partially positioned between said underlying portion and said fender.

12. A motorcycle as claimed in claim 9, wherein said rear fender includes a forward end defining an opening, wherein said wires extend through said opening.

13. A motorcycle as claimed in claim 9, wherein said inner support extends rearward of and generally parallel to said tail support.

* * * * *